(12) United States Patent
Schlueter, Jr.

(10) Patent No.: US 6,602,156 B2
(45) Date of Patent: Aug. 5, 2003

(54) IMAGEABLE SEAMED BELTS HAVING POLYAMIDE AND DOPED METAL OXIDE ADHESIVE BETWEEN INTERLOCKING SEAMING MEMBERS

(75) Inventor: Edward L. Schlueter, Jr., Rochester, NY (US)

(73) Assignee: Xerox Corporation, Stamford, CT (US)

( * ) Notice: Subject to any disclaimer, the term of this patent is extended or adjusted under 35 U.S.C. 154(b) by 21 days.

(21) Appl. No.: 10/003,083

(22) Filed: Dec. 6, 2001

(65) Prior Publication Data

US 2003/0109344 A1 Jun. 12, 2003

(51) Int. Cl.[7] .................................................. F16G 5/00
(52) U.S. Cl. ..................................................... 474/253
(58) Field of Search ............................... 474/253, 254; 252/500, 502, 503

(56) References Cited

U.S. PATENT DOCUMENTS 5,942,301 A * 8/1999 Schlueter et al. ............. 428/58
5,997,974 A * 12/1999 Schlueter et al. ............. 428/58
6,004,709 A * 12/1999 Renfer et al. ............. 430/58.65

OTHER PUBLICATIONS

Licari et al, 1990, Noyes Publications, Second Edition, pp. 112–113.*
Flick, Ernest, 1991, Noyes Publications, Second Edition, pp. 1083–1087.*

* cited by examiner

Primary Examiner—Thomas R. Hannon
Assistant Examiner—Vicky A. Johnson
(74) Attorney, Agent, or Firm—Annette L. Bade

(57) ABSTRACT

A seamed flexible belt having a substrate and a seam having interlocking seam members, wherein the interlocking seam members are held together by an adhesive having polyamide and a doped metal oxide filler, for use in electrostatographic, contact electrostatic, digital and other like printing machines.

22 Claims, 9 Drawing Sheets

IMAGEABLE SEAMED BELTS HAVING POLYAMIDE AND DOPED METAL OXIDE ADHESIVE BETWEEN INTERLOCKING SEAMING MEMBERS

CROSS REFERENCE TO RELATED APPLICATIONS

Attention is directed to U.S. patent application Ser. No. 09/493,445, filed Jan. 28, 2000, entitled "Process and Apparatus for Producing an Endless Seamed Belt;" U.S. patent application Ser. No. 09/470,931 filed Dec. 22, 1999, entitled, "Continuous Process for Manufacturing Imageable Seamed Belts for Printers;" U.S. patent application Ser. No. 09/088,011, filed May 28, 1998, entitled, "Unsaturated Carbonate Adhesives for Component Seams;" U.S. patent application Ser. No. 09/615,444, filed Jul. 13, 2000, entitled, "Polyimide Adhesive For Polyimide Component Interlocking Seams;" U.S. patent application No. 09/615,426, filed Jul. 13, 2000, entitled, "Process For Seaming Interlocking Seams Of Polyimide Component Using Polyimide Adhesive"; U.S. patent application Ser. No. 09/660,248, filed Sep. 13, 2000, entitled, "Imageable Seamed Belts Having Fluoropolymer Adhesive Between Interlocking Seaming Members;" U.S. patent application Ser. No. 09/660,249, filed Sep. 13, 2000, entitled, "Imageable Seamed Belts Having Fluoropolymer Overcoat;" U.S. patent application Ser. No. 09/833,930 filed Apr. 11, 2001, entitled, "Imageable Seamed Belts Having Hot Melt Processable, Thermosetting Resin and Conductive Carbon Filler Adhesive Between Interlocking Seaming Members;" U.S. patent application Ser. No. 09/833,965, filed Apr. 11, 2001, entitled, "Conductive Carbon Filled Polyvinyl Butyral Adhesive;" U.S. patent application Ser. No. 09/833,488, filed April 11, 2001, entitled, "Dual Curing Process for Producing a Puzzle Cut Seam;" U.S. patent application Ser. No. 10/013,665, filed Dec. 13, 2001, entitled, "Oxidized Transport Transfer Member Coatings;" U.S. patent application Ser. No. 09/833,964 filed Apr. 11, 2001, entitled, "Flashless Hot Melt Bonding of Adhesives for Imageable Seamed Belts; U.S. patent application Ser. No. 09/833,546 filed Apr. 11, 2001, entitled "Imageable Seamed Belts having Polyamide Adhesive Between Interlocking Seaming Members;" and U.S. patent application Ser. No. 09/833,507 filed Apr. 11, 2001, entitled "Polyamide and Conductive Filler Adhesive." The disclosures of each of these references are hereby incorporated by reference in their entirety.

BACKGROUND OF THE INVENTION

The present invention is directed to transfer members useful in electrostatographic, including digital printing apparatuses. In specific embodiments, the present invention is directed to seamed belts, and more specifically, to endless flexible seamed belts wherein an image can be transferred at the seam of the belt with little or no print defects caused by the seam. In embodiments, the present invention relates to xerographic component imageable seamed belts comprising an adhesive formed between mutually mating elements of a seam, wherein the adhesive comprises a polymer with electrically conductive filler(s) dispersed or contained therein. In an embodiment, the polymer is a polyamide and the filler is a doped metal oxide filler. In embodiments, an additional electrically conductive filler is present in the adhesive such as, for example, a carbon filler, a metal oxide filler, another doped metal oxide filler, a polymer filler, a charge-transporting molecule, or a mixture thereof. The present invention further provides, in embodiments, a belt having a seam with increased strength because the adhesive is crosslinked. However, the belt is still flexible enough to withstand 180° crease without cracking. The present invention, in embodiments, also provides a belt having a seam in which the height differential between the seam and the rest of the belt is virtually nil. The belt, in embodiments, allows for image transfer at the seam, which cannot be accomplished with known seamed belts. Image transfer is accomplished partly because the present seam possesses the desired conductivity and release properties required for sufficient transfer. The present invention also provides, in embodiments, a ripple-free seam. Further, in embodiments, the seam can be rapidly cured at relatively low temperatures. In addition, the seam, in embodiments, is resistant to alcohol and organic solvents. Moreover, in embodiments, there is no tenting in the seam area. The seam, in embodiments, can withstand repeated electrical transfer cycles and remain functional. In embodiments, the adhesive withstands temperature transients between 25 and 130° C., and is resistant to ambient changes in relative humidity. Moreover, the addition of electrically conductive filler(s) decreases the Coefficient of Expansion (COE) and the Coefficient of Thermal expansion (CTE) of the materials of the layers of the belt. The seam, in embodiments, is virtually to totally invisible to the xerographic imaging process.

In a typical electrostatographic reproducing apparatus such as an electrophotographic imaging system using a photosensitive member, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

In a more typical electrostatic reproducing apparatus, the developer consists of polymeric coated magnetic carrier beads and thermoplastic toner particles of opposite triboelectric polarity with respect to the carrier beads. This is the dry xerographic process.

The developed toner image recorded on the imaging member is transferred to an image receiving substrate such as paper via a transfer member. The toner particles may be transferred by heat and/or pressure to a transfer member, or more commonly, the toner image particles may be electrostatically transferred to the transfer member by means of an electrical potential between the imaging member and the transfer member. After the toner has been transferred to the transfer member, it is then transferred to the image receiving substrate, for example by contacting the substrate with the toner image on the transfer member electrostatically or under heat and/or pressure.

Transfer members enable high throughput at modest process speeds. In four-color photocopier or printer systems, the transfer member also improves registration of the final color toner image. In such systems, the four component colors of cyan, yellow, magenta and black may be synchronously developed onto one or more imaging members and transferred in registration onto a transfer member at a transfer station.

In electrostatographic printing and photocopy machines in which the toner image is transferred from the transfer member to the image receiving substrate, it is desired that the transfer of the toner particles from the transfer member to the image receiving substrate be substantially 100 percent. Less than complete transfer to the image receiving substrate results in image degradation and low resolution. Complete transfer is particularly desirable when the imaging process involves generating full color images since undesirable color deterioration in the final colors can occur when the color images are not completely transferred from the transfer member.

Thus, it is desirable that the transfer member surface has excellent release characteristics with respect to the toner particles. Conventional materials known in the art for use as transfer members often possess the strength, conformability and electrical conductivity necessary for use as transfer members, but can suffer from poor toner release characteristics, especially with respect to higher gloss image receiving substrates.

Polyimide substrate transfer imaging members are suitable for high performance applications because of their outstanding mechanical strength and thermal stability, in addition to their good resistance to a wide range of chemicals. However, the high cost of manufacturing unseamed polyimide belts has led to the introduction of a seamed belt. Even polyimides with the best mechanical and chemical properties often exhibit poor adhesion at the seam even when commercially available primers and adhesives are used.

In the electrostatic transfer applications, use of a seamed transfer polyimide member results in insufficient transfer in that the developed image occurring on the seam is not adequately transferred. This incomplete transfer is partially the result of the difference in seam height to the rest of the belt. A "bump" is formed at the seam, thereby hindering transfer and mechanical performance. The development of puzzle cut seams has increased the quality of transfer somewhat, by decreasing the seam height, thereby allowing smooth cycling. However, even with the improvements made with puzzle cut seams, quality imaging in the seamed area has not been obtainable at present due, in part, to contrast in transfer caused by differences in electrical and release properties of known seaming adhesives. Further, current adhesives do not provide sufficient bonding strength at the seam, resulting in short belt life. In addition, the seam must have the appropriate surface properties in order to allow for sufficient toner release at the seam.

Currently, puzzle cut and overlap seam adhesives consist of uv-curable epoxies and hot-melt adhesives. While these adhesives exhibit acceptable strengths at room temperature under tensile load, most undergo premature failure at elevated temperatures. Additionally, the existing adhesives have been found to perform poorly under some important dynamic test conditions. Because the adhesive seam is not Imageable, most machines do not develop images on the seam area, or non-seamed belts are used.

Improved seam adhesives such as polyamic acid adhesives, have proven to be strong. However, adhesives such as polyamic acid adhesives require long cure times at elevated temperatures (for example, 1 hour at 200° C.) with loss of water as the polyimide seam is formed. The resulting differential shrinkage causes ripples as the adhesive cures and the cured seams are not completely filled with adhesive. If one side of the puzzle cut seam is glued, tenting occurs. If both sides of the puzzle cut seam are treated with polyamic acid adhesive, ripples form. Such ripples in the seam cause uneven development and ultimately result in print defects, and a reduced belt life. Thus, adhesive alternatives to polyamic acid must be considered.

Therefore, it is desired to provide an adhesive system useful to seam puzzle cut seamed belts, wherein the height differential between the seam and the rest of the belt is virtually nil, and the occurrence of ripples and tenting in the seam is reduced or eliminated. It is further desirable to provide an adhesive that has a low temperature rapid cure in order to increase production of the belts at a reduced production cost. It is also desirable to provide an adhesive that is resistant to alcohol and organic solvents. Further, it is desired to provide an adhesive having electrical, mechanical and toner release characteristics that closely match those of the substrates. Also, it is desirable to provide an adhesive which is able to withstand transients in temperatures between 25 and 130° C., and which is resistant to humidity changes. In addition, it is desirable to provide a seam, which is imageable; thereby reducing or eliminating the presence of print or copy defects. It is desirable to have a low temperature-curing adhesive to eliminate ripple and substrate defects due to differential shrinkage of the belt and adhesive. Moreover, it is desirable to provide an adhesive, which allows for a belt flexible enough to withstand 180° bend or crease without cracking, yet strong enough to withstand multiple cycling.

Recent use of a polyamide adhesive has provided a seam which is imageable and which overcomes overcoming many of the undesirable effects listed above. However, the Coefficient of Humidity Expansion (CHE) and CTE are relatively high. This results in water being forced in or out of the substrate during process steps, and causes resistivity changes in orders of magnitude that can adversely affect the electrical functions of the belt. For example, as the material is subjected to different heated seaming process steps and functions in different zones, the resistivity can change from $2 \times 10^9$ ohm-cm to about $2 \times 10^{10}$ ohm-cm. Further, the water being forced in or out of the substrate can also cause a change in the dimensions of the material. For larger belts, the change is much larger and more significant. For example, a 2,800 mm circumference belt was shown to change about 28 mm as the water was forced either in or out of the material formulation during processing.

Therefore, there is a desire to produce a belt and adhesive system, which results in a lower CHE and CTE. In addition, it is desirable to provide a belt and adhesive systems which reduces or eliminates the effects of water being forced into and out of the substrate. Moreover, it is desirable to provide a belt and adhesive system in which the electrical and dimensional properties remain virtually or entirely unchanged during processing.

U.S. Pat. No. 5,549,193 relates to an endless flexible seamed belt comprising puzzle cut members, wherein at least one receptacle has a substantial depth in a portion of the belt material at the belt ends.

U.S. Pat. No. 5,721,032 discloses a puzzle cut seamed belt having a strength-enhancing strip.

U.S. Pat. No. 5,487,707 discloses a puzzle cut seamed belt having a bond between adjacent surfaces, wherein an ultraviolet cured adhesive is used to bond the adjacent surfaces.

U.S. Pat. No. 5,514,436 relates to a puzzle cut seamed belt having a mechanically invisible seam, which is substantially equivalent in performance to a seamless belt.

SUMMARY OF THE INVENTION

Embodiments of the present invention include: an endless seamed flexible belt comprising a first end and a second end, each of the first end and the second end comprising a plurality of mutually mating elements which join in an interlocking relationship to form a seam, the belt comprising a substrate and the seam comprising an adhesive comprising a polyamide and a doped metal oxide filler.

In addition, embodiments of the present invention include: an endless seamed flexible belt comprising a first end and a second end, each of the first end and the second end comprising a plurality of mutually mating elements which join in an interlocking relationship to form a seam, said belt comprising a polyimide substrate, and the seam comprising an adhesive comprising an alcohol-soluble polyamide and a doped metal oxide filler.

Embodiments further include: an image forming apparatus for forming images on a recording medium comprising: a charge-retentive surface to receive an electrostatic latent image thereon; a development component to apply toner to the charge-retentive surface to develop the electrostatic latent image to form a developed image on said charge retentive surface; a transfer belt to transfer the developed image from the charge retentive surface to a copy substrate, wherein the transfer belt is an endless seamed flexible belt comprising a first end and a second end, each of the first end and the second end comprising a plurality of mutually mating elements which join in an interlocking relationship to form a seam, the transfer belt comprising a substrate and the seam comprising an adhesive comprising a polyamide and a doped metal oxide filler; and a fixing component to fuse the developed image to the copy substrate.

BRIEF DESCRIPTION OF THE DRAWINGS

For a better understanding of the present invention, reference may be had to the accompanying figures.

DETAILED DESCRIPTION OF THE PRESENT INVENTION

The present invention relates to an endless flexible seamed belt having a puzzle cut seam, wherein the seam comprises an adhesive comprising a polymer and an electrically conductive filler. In embodiments, the polymer is a polyamide material and the filler is a doped metal oxide filler. The invention provides, in embodiments, an adhesive system useful to seam puzzle cut seamed belts, wherein the height differential between the seam and the rest of the belt is virtually nil, and wherein the occurrence of ripples and tenting in the seam is reduced or eliminated. The present invention further provides, in embodiments, an adhesive that has a low temperature rapid cure in order to increase production of the belts at a reduced production cost. Further, the present invention provides, in embodiments, an adhesive that is resistant to alcohol and organic solvents. The adhesive system, in embodiments, also allows the seam to have thermal and mechanical characteristics closely matching those of the robust substrate. The present invention, in embodiments allows for a belt flexible enough to withstand 180° bend or crease without cracking, yet strong enough to withstand multiple cycling. The adhesive has electrical and mechanical properties which, in embodiments, can withstand transients in temperatures between 25 and 130° C., and is resistant to changes in humidity. In addition, the invention, in embodiments, provides an adhesive having electrical, mechanical and toner release characteristics that closely match those of the substrates. Moreover, the invention, in embodiments, provides a seam, which is Imageable, thereby reducing or eliminating the presence of print or copy defects. Moreover, the seam, in embodiments, allows for extended life of the belt. In addition, in embodiments, the invention allows for a lowering of CHE and CTE, thereby providing a belt that is more stable and is less, or not at all, adversely affected by processing steps.

In embodiments, the belt is an intermediate transfer belt, sheet, roller, or film useful in xerographic, including digital, apparatuses. However, the belts herein having a seam comprising a polyamide and optional filler can be useful as belts, rollers, drelts (a hybrid of a drum and a belt), and the like, for many different processes and components such as photoreceptors, fusing members, transfix members, bias transfer members, bias charging members, developer members, image bearing members, conveyor members, cleaning members, and other members for contact electrostatic printing applications, xerographic applications, including digital, and the like. Further, the belts, herein, can be used for both liquid and dry powder xerographic architectures, although dry is preferred.

Figure 1:
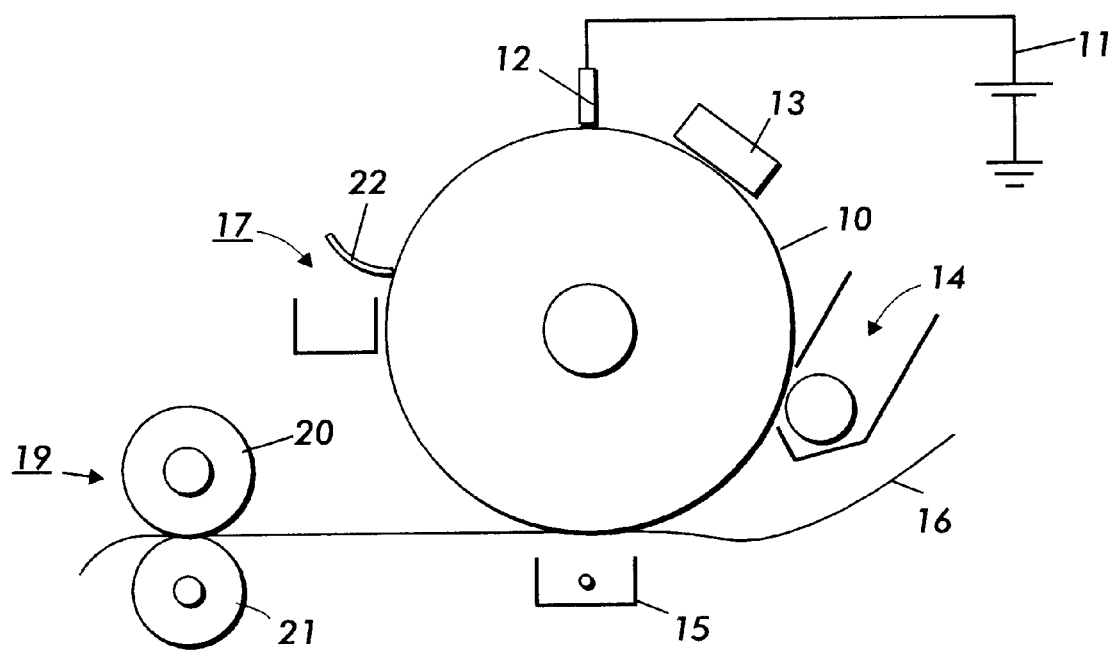
FIG. 1 is a depiction of an electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of an electrical charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. In embodiments, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
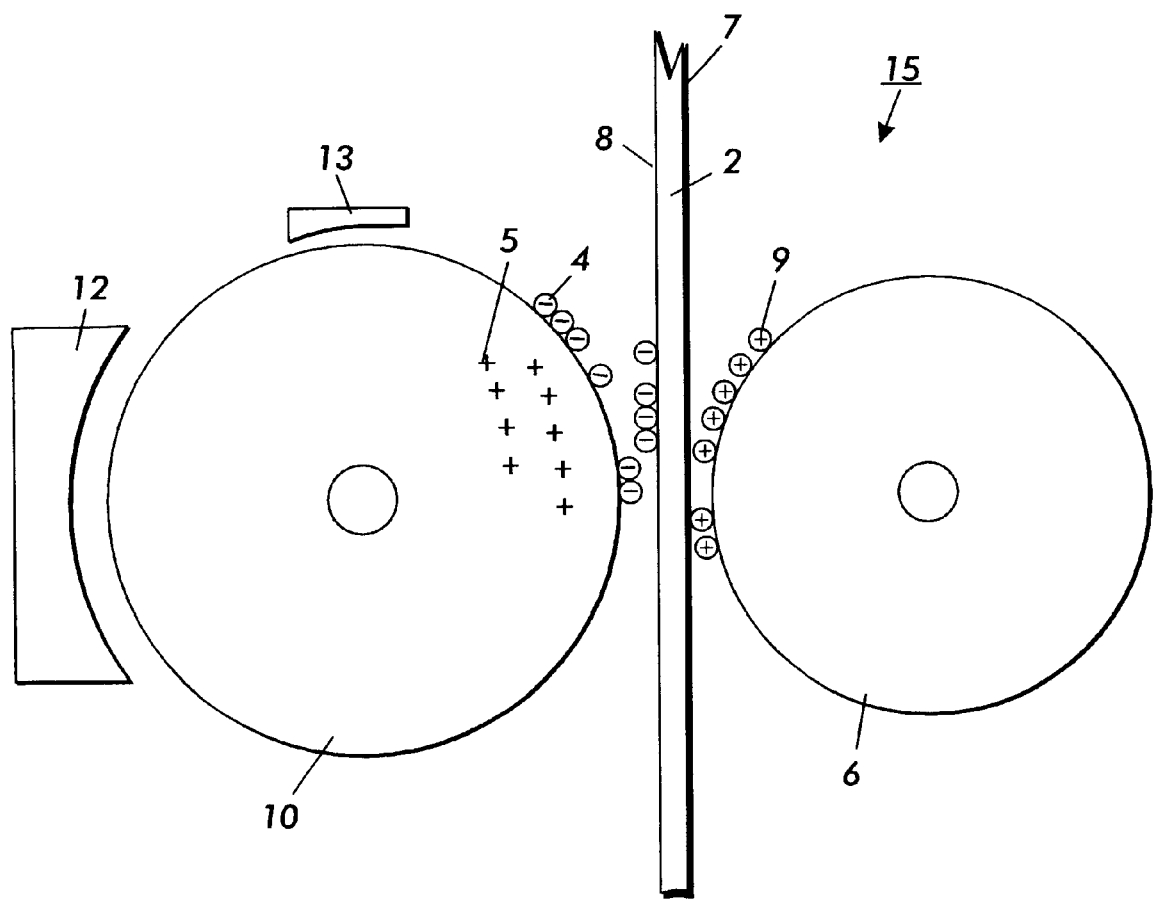
FIG. 2 is an enlargement of a transfer system according to an embodiment of the present invention.

FIG. 2 is a schematic view of an image development system containing an intermediate transfer member. FIG. 2 demonstrates another embodiment of the present invention and depicts a transfer apparatus 15 comprising a transfer member 1 positioned between an imaging member 10 and a transfer roller 6. The imaging member 10 is exemplified by a photoreceptor drum. However, other appropriate imaging members may include other electrostatographic imaging receptors such as ionographic belts and drums, electrophotographic belts, and the like.

In the multi-imaging system of FIG. 2, each image being transferred is formed on the imaging drum by image forming station 12. Each of these images is then developed at developing station 13 and transferred to transfer member 2. Each of the images may be formed on the photoreceptor drum 10 and developed sequentially and then transferred to the transfer member 2. In an alternative method, each image may be formed on the photoreceptor drum 10, developed, and transferred in registration to the transfer member 2. In an embodiment of the invention, the multi-image system is a color copying system. In this color copying system, each color of an image being copied is formed on the photoreceptor drum. Each color image is developed and transferred to the transfer member 2. As above, each of the colored images may be formed on the drum 10 and developed sequentially and then transferred to the transfer member 2. In the alternative method, each color of an image may be formed on the photoreceptor drum 10, developed, and transferred in registration to the transfer member 2.

After latent image forming station 12 has formed the latent image on the photoreceptor drum 10 and the latent image of the photoreceptor have been developed at developing station 13, the charged toner particles 4 from the developing station 13 are attracted and held by the photoreceptor drum 10 because the photoreceptor drum 10 possesses a charge 5 opposite to that of the toner particles 4. In FIG. 2, the toner particles are shown as negatively charged and the photoreceptor drum 10 is shown as positively charged. These charges can be reversed, depending on the nature of the toner and the machinery being used. In an embodiment, the toner is present in a liquid developer. However, the present invention, in embodiments, is useful for dry development systems also.

A biased transfer roller 6 positioned opposite the photoreceptor drum 10 has a higher voltage than the surface of the photoreceptor drum 10. As shown in FIG. 2, biased transfer roller 6 charges the backside 7 of transfer member 2 with a positive charge. In an alternative embodiment of the invention, a corona or any other charging mechanism may be used to charge the backside 7 of the transfer member 2.

The negatively charged toner particles 4 are attracted to the front side 8 of the transfer member 2 by the positive charge 9 on the backside 7 of the transfer member 2.

Figure 3:
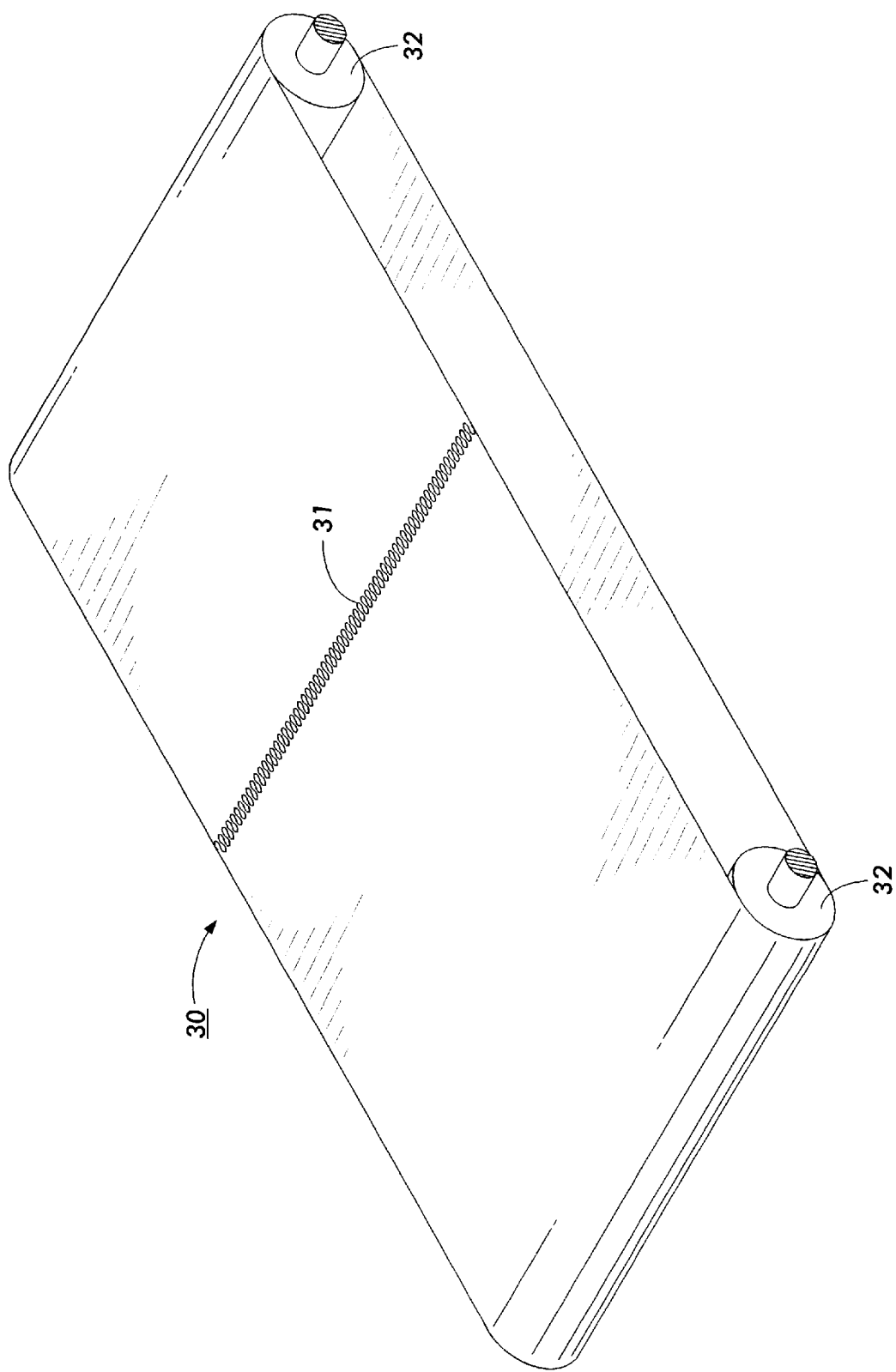
FIG. 3 is an enhanced view of an embodiment of a belt configuration and seam according to the present invention.

FIG. 3 demonstrates an example of an embodiment of a belt in accordance with the present invention. Belt 30 is demonstrated with seam 31. Seam 31 is pictured as an example of one embodiment of a puzzle cut seam. The belt is held in position and turned by use of rollers 32. Note that the mechanical interlocking relationship of the seam 31 is present in a two-dimensional plane when the belt 30 is on a flat surface, whether it be horizontal or vertical. While the seam is illustrated in FIG. 3 as being perpendicular to the two parallel sides of the belt, it should be understood that it may be angled or slanted with respect to the parallel sides. This enables any noise generated in the system to be distributed more uniformly and the forces placed on each mating element or node to be reduced.

The seam formed according to the present invention is one having a thin and smooth profile, of enhanced strength, improved flexibility and extended mechanical life. In an embodiment, the belt ends are held together by the geometric relationship between the ends of the belt material, which are fastened together by a puzzle cut. The puzzle cut seam can be of many different configurations, but is one in which the two ends of the seam interlock with one another in a manner of a puzzle. Specifically, the mutually mating elements comprise a first projection and a second receptacle geometrically oriented so that the second receptacle on the first end receives the first projection on the second end and wherein the first projection on the first end is received by the second receptacle on the second end. The seam has a kerf, void or crevice between the mutually mating elements at the two joining ends of the belt, and that crevice can be filled with an adhesive according to the present invention. The opposite surfaces of the puzzle cut pattern are bound or joined together to enable the seamed flexible belt to essentially function as an endless belt. In the present invention, the seam including the puzzle cut members, is held together by a polyamide adhesive, which is compatible with the rest of the belt. The belt, in embodiments, provides improved seam quality and smoothness with substantially no thickness differential between the seam and the adjacent portions of the belt.

Figure 4:
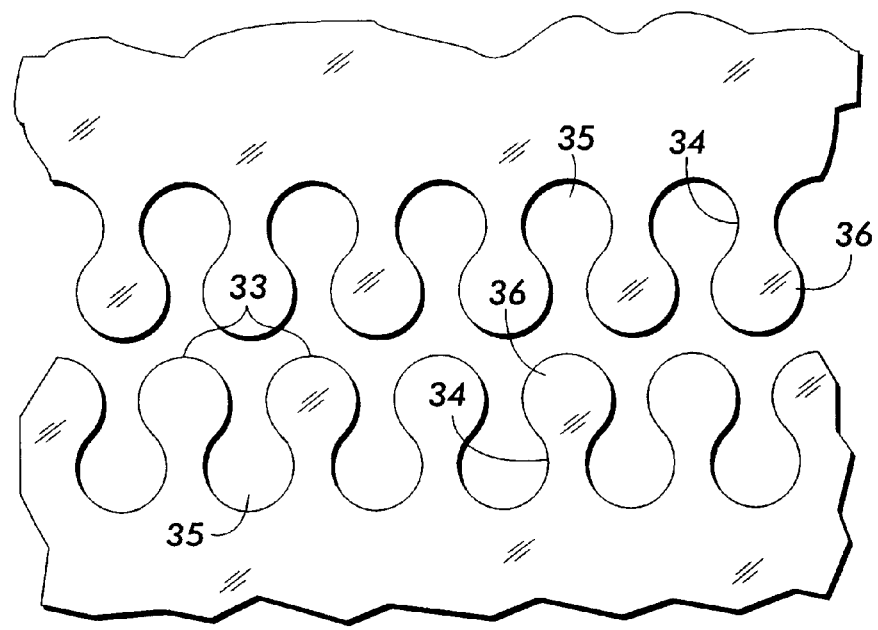
FIG. 4 is an enlargement of a puzzle cut seam having a multiplicity of head and neck members according to one embodiment of the present invention.
Figure 5:
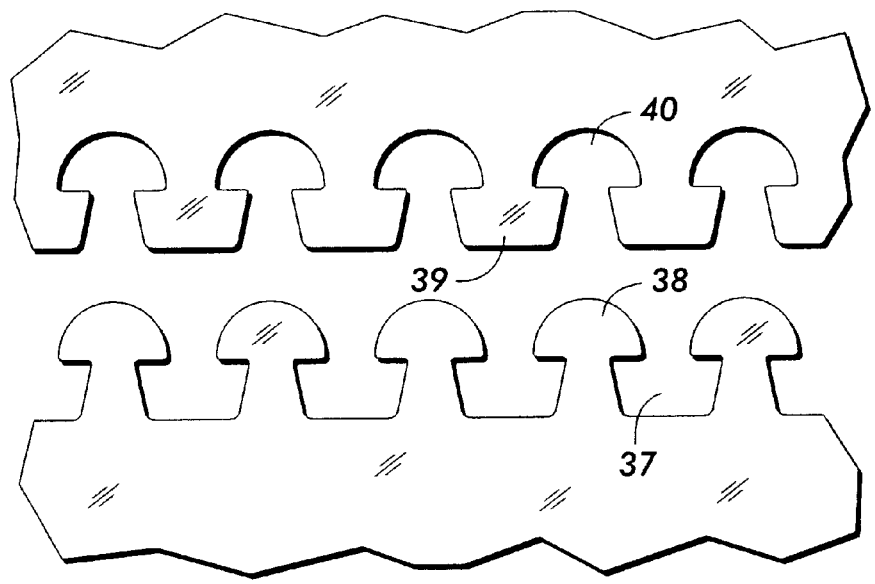
FIG. 5 is an enlargement of a puzzle cut seam having mushroom-shaped puzzle cut members according to another embodiment of the present invention.
Figure 6:
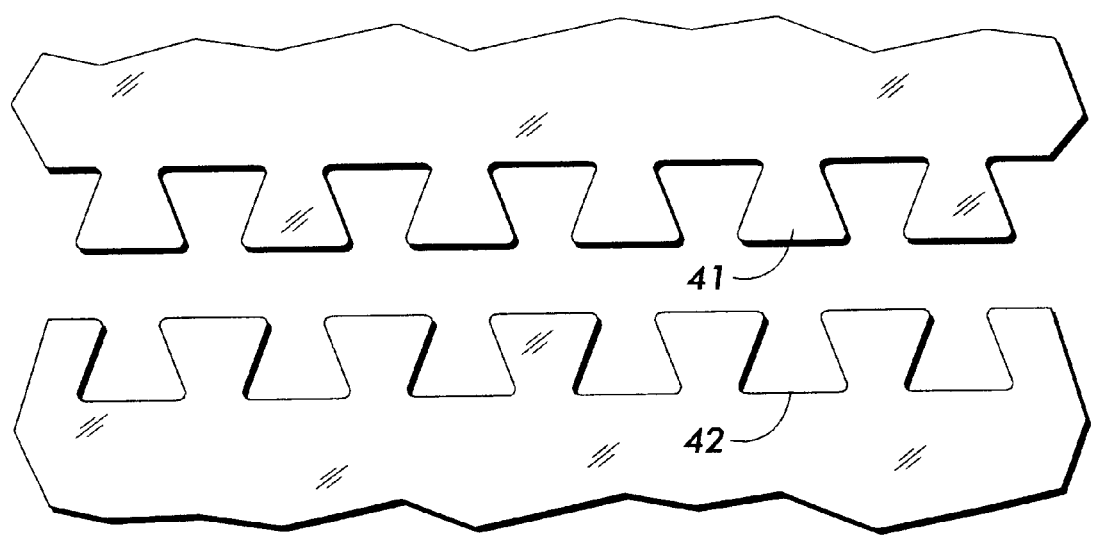
FIG. 6 is an enlargement of a puzzle cut seam having dovetail members according to another embodiment of the present invention.
Figure 7:
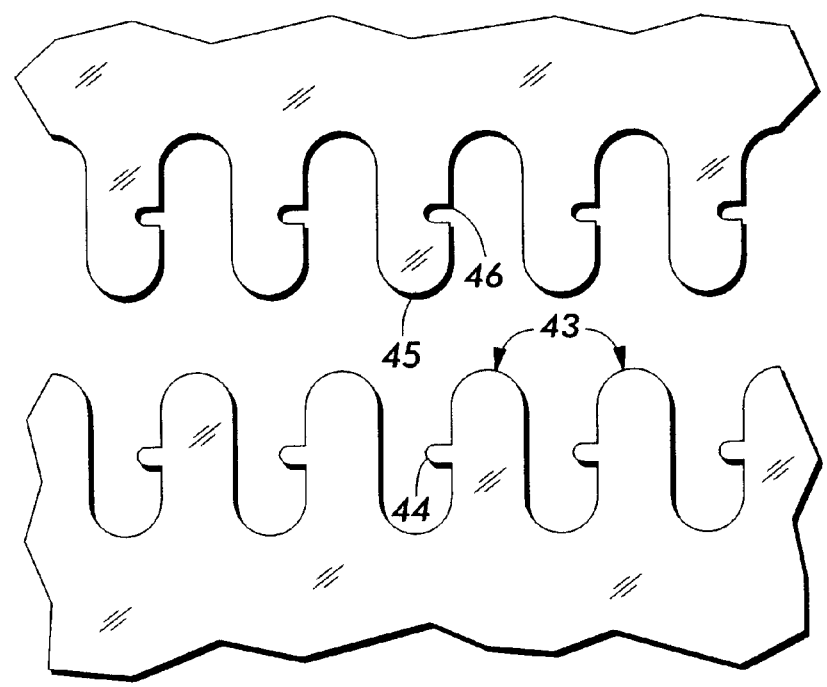
FIG. 7 is an enlargement of a puzzle cut seam having receptacles (recessors) and teeth members according to another embodiment of the present invention.

An example of an embodiment of a puzzle cut seam having two ends, each of the ends comprising puzzle cut members or mutually mating elements is shown in FIG. 4. The puzzle cut pattern may take virtually any form, including that of nodes such as identical post or neck 34 and head 33 or node patterns having projections 36 and receptacles 35 which interlock when brought together as illustrated in FIG. 4. The puzzle cut pattern may also be of a more mushroom-like shaped pattern having first projections 38 and 39 and second receptacles 40 and 37 as illustrated in FIG. 5, as well as a dovetail pattern as illustrated in FIG. 5 having first projections 41 and second receptacles 42. The puzzle cut pattern illustrated in FIG. 7 has a plurality of first fingers 43 with interlocking teeth 44 and plurality of second fingers 45 which have recesses 46 to interlock with the teeth 44 when assembled. In embodiments, the interlocking elements all have curved mating elements to reduce the stress between the interlocking elements and permit them to separate when traveling around curved members such as the rolls 32 of FIG. 3. It has been found that with curved mating elements that the stress is lower than with square corners where rather than the stress being uniformly distributed it is concentrated leading to possible failure.

Figure 8:
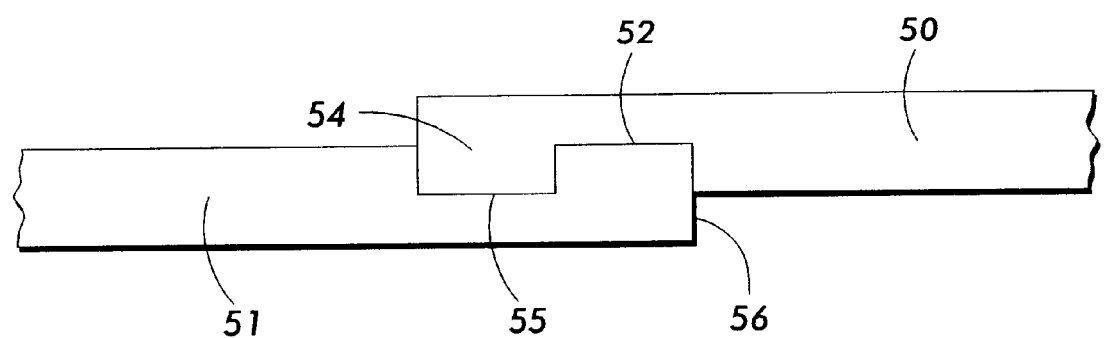
FIG. 8 is an enlargement of a puzzle cut seam having receptacle and projection members of differing depth according to another embodiment of the present invention.

Another example of a puzzle cut seam is shown in FIG. 8 in which the mutually mating elements or puzzle cut members comprise a first member 50 and a second member 51, wherein the first member 50 comprises a first receptacle 52 and a first projection 54, and the second member 51 comprises a second receptacle 55 and a second projection 56. The first receptacle 52 of the first member 50 receives the second projection 56 of the second member 51, and the second receptacle 55 of the second member 51 receives the first projection 54 of the first member 50. In order to reduce the height differential between the seamed portion and the adjacent, unseamed portion of the belt, it is desirable to have the second receptacles formed within their individual members at a substantial depth in a portion of the belt as the belt ends.

In embodiments, the height differential between the seam and the rest of the belt (the nonseamed portions of the belt) is practically nil, or from about 0 to about 25 micrometers, or from about 0.0001 to about 25 micrometers, or from about 0.01 to about 5 micrometers.

Figure 9:
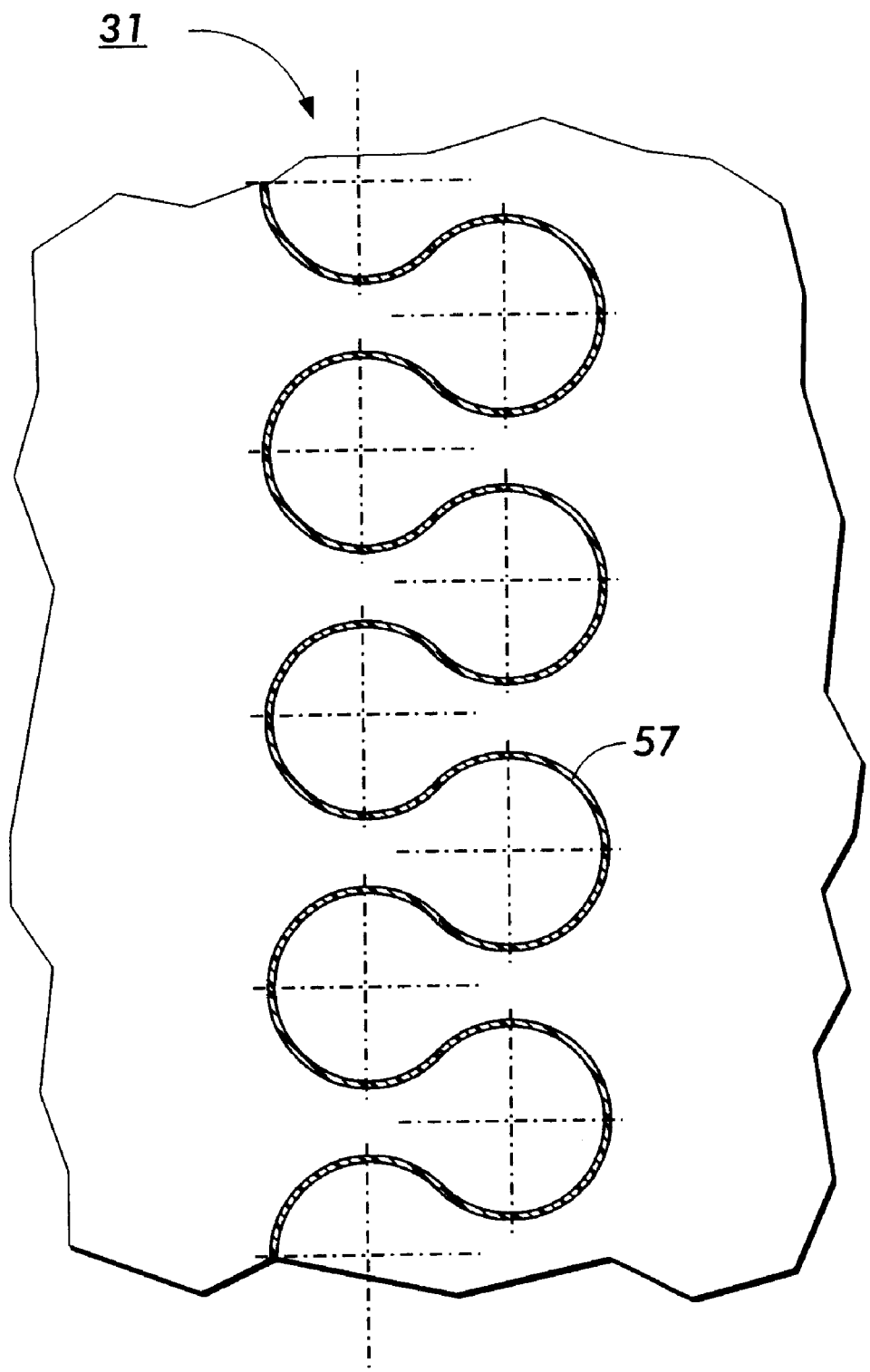
FIG. 9 is an enlarged version of a belt according to one embodiment of the present invention and demonstrates a crevice between the puzzle cut members, the crevice containing an adhesive.

A polyamide resin is present between the seam, and placed in the crevice between the puzzle cut members to a thickness of from about 0.001 to about 50 micrometers. As shown in one embodiment of a puzzle cut seam 31 according to the present invention, the adhesive is present between the puzzle cut members and at the seam crevice 57 of FIG. 9.

The adhesive is chosen to have a resistivity within the range desired for electrostatic transfer of toner. In embodiments, the resistivity of the seam is the same or similar to that of the belt in order to provide the same electrical properties for the seam and the rest of the belt. A volume resistivity for toner transfer performance is from about $10^1$ to about $10^{13}$ ohms-cm, or from about $10^9$ to about $10^{13}$ ohms-cm. When the belt and the seam of the belt have a same or substantially the same electrical resistance, the toner transfer at the seam is the same or substantially the same as the transfer at the belt. Such transfer at the seam provides an invisible or substantially invisible seam.

The electrical properties can be tailored by varying the amount of fillers, by changing the type of filler added, and/or by changing the curing procedure.

An adhesive for use with a belt seam, such as a puzzle cut belt seam, is a polyamide resin. In embodiments, the polyamide resin is alcohol-soluble. By "alcohol-soluble," Applicants refer to materials, which dissolve in alcohols such as butanol, ethanol, methanol and the like. In embodiments, the polyamide resin in the adhesive has functional pendant groups selected from the group consisting of methoxy, ethoxy and hydroxy pendant groups. In embodiments, the pendant functional group is a methoxy methylene group. In embodiments, the polyamide has the following formula:

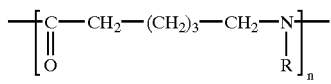

wherein n is a number of from about 50 to about 1,000, or from about 150 to about 500, or about 270, and wherein R is selected from the group consisting of hydrogen; alkyl having from about 1 to about 20 carbons, or from about 1 to about 10 carbons, such as methyl, ethyl, propyl and the like; alkoxy having from about 1 to about 20 carbons, or from about 1 to about 10 carbons such as methoxy, ethoxy, propoxy and the like; alkyl alkoxy having from about 1 to about 20 carbons, or from about 1 to about 10 carbons such as methyl methoxy, methyl ethoxy, ethyl methoxy, methyl dimethoxy, methyl trimethoxy, and the like; and alkylene alkoxy having from about 1 to about 20 carbons, or from about 1 to about 10 carbons such as methylene methoxy, ethylene ethoxy, and the like. In embodiments, monomers of the above formula can be included in an adhesive composition, wherein R in the monomers can be hydrogen, methylene methoxy, and methylene dimethoxy, or R in the adhesive composition can be from about 40 to about 80 mole percent hydrogen, or from about 50 to about 65 mole percent hydrogen, or about 64 mole percent hydrogen; and from about 20 to about 45 mole percent methylene methoxy, or from about 30 to about 35 mole percent methylene methoxy, or about 32 mole percent methylene methoxy; and from about 1 to about 10 mole percent methylene dimethoxy, or from about 1 to about 5 mole percent methylene dimethoxy, or about 4 mole percent methylene dimethoxy. Typical commercially available alcohol-soluble polyamide polymers suitable for use herein include those sold under the tradenames LUCKAMIDE® 5003 from Dai Nippon Ink, NYLON® 8, CM4000® and CM8000® both from Toray Industries, Ltd., and other N-methylene methoxy pendant polyamides such as those prepared according to the method described in Sorenson and Campbell, "Preparative Methods of Polymer Chemistry," second edition, pg. 76, John Wiley & Sons, Inc., 1968, and the like, and mixtures thereof.

A suitable, fine powder, conductivity-enhancing filler that is uniformly dispersed without large agglomerates in the above resins, can be used with the present adhesive. In embodiments, the filler is a doped metal oxide filler. Examples of doped metal oxide fillers include aluminum doped zinc oxide (ZnO), antimony doped titanium dioxide ($TiO_3$), antimony doped tin oxide, similar doped oxides, and mixtures thereof.

In embodiments, more than one electrically conductive filler can be present in the adhesive. Examples of suitable fillers, in addition to a doped metal oxide filler, include a carbon fillers, metal oxide fillers, doped metal oxide fillers, polymer fillers, charge transporting molecules, and mixtures thereof. Other conductive fillers include silicon powder, quaternary salts such as quaternary ammonium salts (for examples Adogen 464 sold by Aldrich Chemical as methyltrialkyl ($C_8$–$C_{10}$) ammonium chloride), and pyrolyzed polyacrylonitrile particles and fibers.

Examples of carbon fillers include carbon black, graphite, fluorinated carbon, or mixtures thereof. Specific examples of fluorinated carbons include those having the formula $CF_x$ with x representing the number of fluorine atoms and generally being up to about 1.5, or from about 0.01 to about 1.5, or from about 0.04 to about 1.4. Other examples of fluorinated carbons are poly(dicarbon monofluoride) which is usually written in the shorthand manner $(C_2F)_n$. Examples of fluorinated carbons selected include those described in U.S. Pat. No. 4,524,119 to Luly et al., the subject matter of which is hereby incorporated by reference in its entirety, and those having the tradename ACCUFLUOR®, (fluorinated carbons from Advanced Research Chemicals, Inc., Catoosa, Okla.). Examples include ACCUFLUOR® 2028, ACCUFLUOR® 2065, ACCUFLUOR® 1000, and ACCUFLUOR® 2010. ACCUFLUOR® 2028 and ACCUFLUOR® 2010 have 28 and 11 percent by weight fluorine, respectively, based on the weight of fluorinated carbon. ACCUFLUOR® 1000 and ACCUFLUOR® 2065 have 62 and 65 percent by weight fluorine, respectively, based on the weight of fluorinated carbon. Also, ACCUFLUOR® 1000 comprises carbon coke, whereas ACCUFLUOR® 2065, 2028 and 2010 all comprise conductive carbon black. These fluorinated carbons are of the formula $CF_x$ and are formed by the reaction of $C+F_2=CF_x$.

Examples of metal oxide fillers include titanium dioxide, tin (II) oxide, aluminum oxide, indium-tin oxide, magnesium oxide, copper oxide, iron oxide, and the like, and mixtures thereof.

Examples of polymer fillers include polypyrrole, polyacrylonitrile (for example, pyrolyzed polyacrylonitrile), polyaniline, polythiophenes, and mixtures thereof.

Examples of charge transporting molecules include bis (dihydroxy diethylamino-)triphenyl methane (DHTPM), bis (diethylamino) triphenyl methane (TPM), dihydroxy tetraphenyl biphenylene diamine (DHTBD), and the like, and mixtures thereof. In embodiments, the charge transporting molecules include DHTPM and DHTBD.

In embodiments, the filler(s) is/are present in the adhesive in a total amount of from about 1 to about 80, or from about 20 to about 50 percent by weight of total solids. Total solids, as used herein, refers to the amount of polymer resin, filler(s), crosslinking agent, other additives, and other solids present in the adhesive.

Crosslinking agents can be used in combination with the polyamide to promote crosslinking of the polymer, thereby providing a strong bond. Examples of suitable crosslinking agents include oxalic acid, p-toluene sulfonic acid, phosphoric acid, sulfuric acid, and the like, and mixtures thereof. In embodiments, the crosslinking agent is oxalic acid.

The adhesive solution may be applied at the seam and between interlocking seaming members, by any suitable means such as using a cotton-tipped applicator, liquid dispenser, glue gun and other known means. An amount in slight excess of the amount required to completely fill the seam kerf when dry of adhesive is added between interlocking seaming members.

The adhesive may be applied at the seam and between interlocking seaming members by using a solid film tape of the adhesive. The adhesive is melted into the seam kerf under applied temperature and pressure. Continued heating allows the resin to crosslink.

In general, the process for seaming using the adhesive herein involves compounding the resin with the filler, followed by forming the liquid-phase composite into a solid phase, thin layer, adhesive film. Crosslinking agents such as oxalic acid can be used. The adhesive film composite, with or without a removable release backing, is then applied to align with only the puzzle-interlocked seamed region of the belt or film member. The seam can then be cured by various methods. Curing procedures useful in curing the seam include room temperature moisture curing, thermal curing and infrared curing. Examples of heat curing include use of moderate heat once the adhesive is placed in the seam crevice. This moderate heating also increases the crosslinking/solidification reaction and increases the seam processing and belt fabrication speed.

The adhesive allows for low-temperature rapid curing, enabling faster production of belts. In embodiments, the adhesive may be cured between the seaming members at a time of from about 1 minute to about 1 hour, or from about 20 to about 30 minutes, at a temperature of from about 80 to about 180° C., or from about 100 to about 120° C. Heat may be applied by, for example, a heat gun, oven, Vertrod or Sencor seam welder, or other suitable means.

The substrate is robust enough to undergo multiple cycling through rigorous use. Examples of suitable substrate materials include polyimides with or without conductive fillers, such as semiconductive polyimides such as polyaniline polyimide, carbon filled polyimides, carbon filled polycarbonate, and the like. Examples of commercially available polyimide substrates include KAPTON® and UPLIEX® both from DuPont, and ULTEM® from GE.

The substrate may include a filler. In embodiments, the filler, if present in the substrate, is present in an amount of from about 1 to about 60, or from about 3 to about 40 percent by weight of total solids. Examples of suitable fillers for use in the substrate include carbon fillers, metal oxide fillers, doped metal oxide fillers, other metal fillers, other conductive fillers, and the like. Specific examples of fillers include carbon fillers such as carbon black, silicon particles, fluorinated carbon black, graphite, low conductive carbon, and the like, and mixtures thereof; metal oxides such as indium tin oxide, zinc oxide, iron oxide, aluminum oxide, copper oxide, lead oxide, and the like, and mixtures thereof; doped metal oxides such as antimony-doped tin oxide, antimony-doped titanium dioxide, aluminum-doped zinc oxide, similar doped metal oxides, and mixtures thereof; and polymer particles such as polytetrafluoroethylene, polypyrrole, polyaniline, doped polyaniline, and the like, and mixtures thereof.

Figure 10:
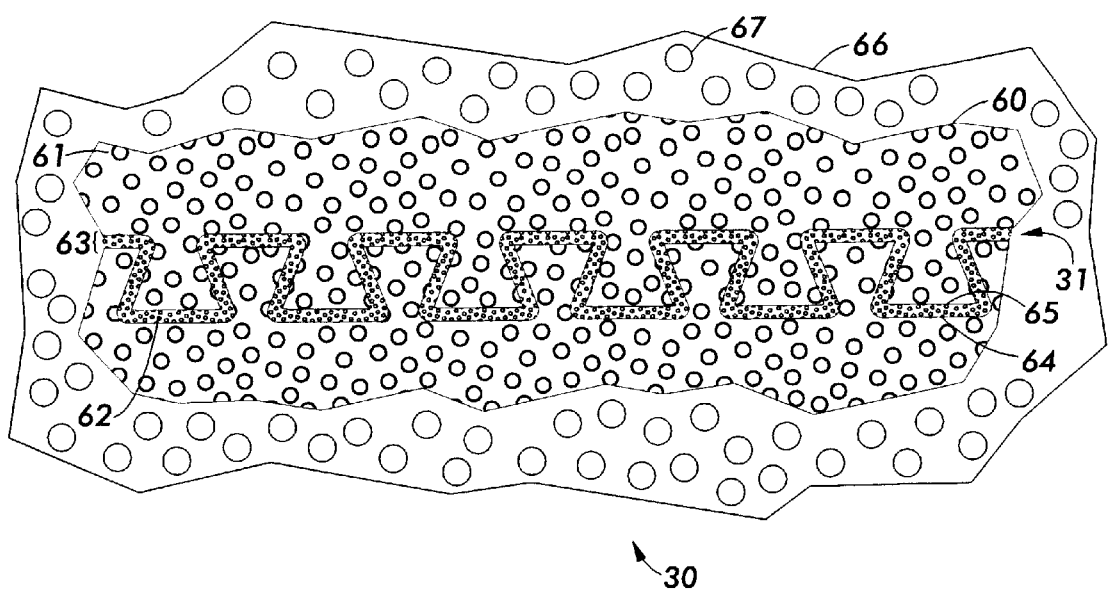
FIG. 10 is an enlarged cross-sectional view of a belt according to an embodiment of the invention.

An example of a belt used in combination with the polyamide resin adhesive is depicted in FIG. 10. The belt 30 comprises a substrate 60, having therein, in embodiments, conductive fillers 61. The belt contains seam 31 having an adhesive 63 positioned between the seam members 64 and 65. In an embodiment, conductive fillers 62 are dispersed or contained in the adhesive. Conductive fillers 61 optionally dispersed or contained in the substrate and fillers 62 optionally contained or dispersed in the adhesive, may be the same or different.

The adhesive herein provides an excellent seam adhesive for belts, and in embodiments, polyimide intermediate transfer belts.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1

Preparation of Intermediate Transfer Belt

Intermediate transfer belt test samples were fabricated using polyamide with various loadings of carbon black, polyaniline and/or ZELEC® (antimony doped tin oxide). These samples were fabricated into thin films and processed using typical drying, curing and post curing techniques. The samples included polyamide adhesives having ZELEC® as a filler. The samples were then tested for Coefficient of Thermal Expansion and Coefficient of Humidity Expansion.

Specifically, the belts were subjected to several process steps that applied heat and removed water from the belt material. The belt was also subjected to various xerographic process steps that removed water and applied heat to the transfer belt. When the belt was subjected to these changes, the electrical conductivity of the belt changed.

Figure 11:
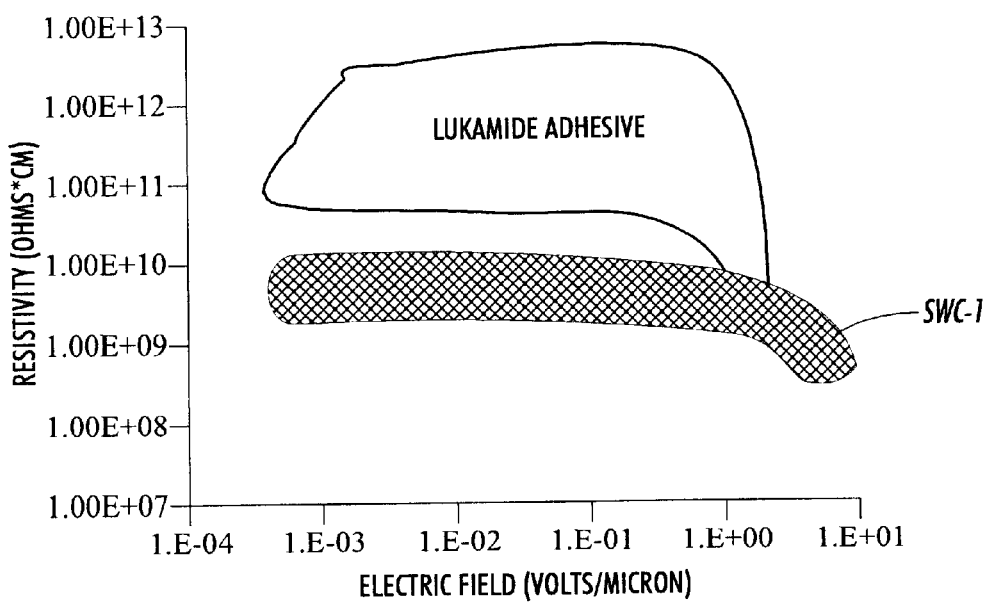
FIG. 11 is a graph of resisitivites (ohm-cm) as a function of applied electrical field (volts/microns) for samples of polyamide adhesives both containing and not containing a doped metal oxide.

FIG. 11 shows a carbon filled polyamide labeled SWC-1. This type of material has a CHE of approximately 60 PPM/% RH and shows an approximate change in resistivity from about $1\times10^9$ to about $1\times10^{10}$ ohm-cm as the humidity is changed from dry (about 10% RH) to humid (about 80% RH). This resistivity change was observed during both the processing of the belt, and during use of the belt in a machine. Polyamide adhesives with no fillers (such as LUCKAMIDE®) had a different resistivity range and had a different % RH response than the parent belt material. The result is that for non-doped metal oxide filled polyamide adhesives, there were changes in transfer efficiencies in response to changes in resistivity and RH conditions.

Figure 12:
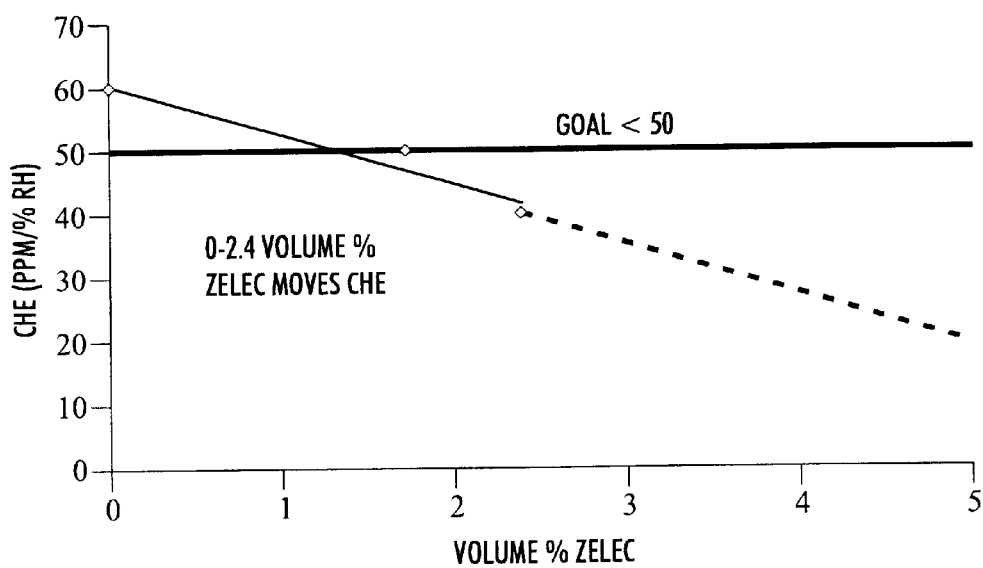
FIG. 12 is a graph of CHE (Coefficient of Humidity Expansion) (ppm/% RH) as a function of volume loading of antimony doped tin oxide for samples of polyamide adhesives.

Polyamide material was loaded with a doped metal oxide filler (ZELEC®—antimony doped tin oxide). The filled polyamide can be used for both the belt material and the adhesive. As seen in FIG. 12, increased loadings of the doped metal oxide filler lowered the CHE response of the belt material and adhesive to changes in RH and temperature. This led to a more stable belt material during processing, and a more stable belt material during use in a machine. More specifically, FIG. 12 demonstrates that a sample having no doped metal oxide exhibited an undesirable CHE of 60 PPM/% RH. A desirable CHE is 50 or less. However, samples having from about 1 to about 2.4 volume percent doped metal oxide exhibited more desirable CHE of from about 50 to about 40 PPM/% RH, and less change in CHE in response to changes in RH and temperature.

Therefore, the results shown in FIGS. 11 and 12 indicate that higher levels of doped metal oxide filler stabilized the polyamide material from swings in temperature and humidity. Therefore, a more thermally and humidity stable material led to less conductivity variations as the belt was processed and as it functioned in a xerographic machine.

Example 2
Preparation of Polyamide Adhesive (Sample 1)

The following were combined in an 8-ounce amber bottle and heated with magnetic stirring in a water bath at about 60° C. to make Sample 1: about 4 grams LUCKAMIDE® (from Dai Nippon Ink), about 10 grams methanol, and about 10 grams 1-propanol. A solution formed within 30 minutes. This solution was then allowed to cool to about 25° C. Subsequently, about 0.3 grams of trioxane (a crosslinker) and about 0.4 grams oxalic acid were added and the mixture was warmed under about 50° C. tap water until a solution formed. The liquid adhesive was then ready to apply to a puzzle cut seam.

Alternatively, a "Hot Melt" LUCKAMIDE® adhesive is prepared by solvent coating a film (3 to 5 mil dry thickness) of the adhesive on a release substrate, such as corona treated IFS3 Industrial Fluorosilicone Release Film Number 44461 from Mylan Technologies, Inc., St. Albans, Vt., or TEDLAR® release films from E.I. du Pont de Nemours and Company. The solvent is then allowed to evaporate in an oven at about 50° C. (well under its curing temperature of 110 to 130° C.) for 1 hour. Strips of the dried semiconductive LUCKAMIDE® adhesive on the release film are cut slightly wider than the puzzle cut seam and are used to weld (under heat and pressure) the puzzle cut seam together.

To produce a less conductive coating composition, less oxalic acid and/or less DHTBD can be used. To produce a more conductive matrix, the addition of carbon black rendered the composition considerably more conductive, because carbon black injects charges into the hole conducting matrix under the influence of applied electrical fields.

Example 3
Preparation of Polyamide Adhesive (Sample 2)

The formulation described in Example 2 was prepared, except that 3.6 grams of DHTBD was used instead of 4 grams, and 0.4 grams of either triphenyl methane (TPM) or dihydroxy triphenyl methane (DHTPM) was used. This adhesive was Sample 2.

Example 4
Preparation of Polyamide Adhesive with Various Amounts of Carbon Black (Samples 3–8 and Group Samples A–D)

Samples 3–8 were made as follows. To a 60-mL brown amber bottle with TEFLON® sealed cap were added: LUCKAMIDE® (4 g), DHTBD (4 g), trioxane (0.3 g, 7.5 wt.%), and various amounts of Black Pearls® 2000 carbon black as follows: Sample 3—(0.04), Sample 4—(0.2 g), Sample 5 (0.2 g), Sample 6—(0.4 g), Sample 7—(0.6 g), and Sample 8—(0.8 g), and a 1 to 1 mixture of methanol and 1-propanol (20 grams) were added. The LUCKAMIDE®, DHTBD, carbon black and solvent were heated at 160° F. in a water bath to form a dispersion in which all the ingredients except the carbon black dissolved. Steel shot (60 g) was then added and the capped container was roll-milled or paint shaken for at least 16 hours. Oxalic acid (a crosslinker) was then added in Group Sample A (0.3 g, or 7.5 weight percent based on LUCKAMIDE®), Group Sample B (0.4 g, 10 weight percent based on LUCKAMIDE®), Group Sample C (0.6 g, 15 weight percent based on LUCKAMIDE®) and Group Sample D (0.8 g, 20 weight percent based on LUCKAMIDE®).

Example 5
Preparation of Polyamide Adhesive Tapes with Various Amounts of PPAN (Samples 20–24)

Freestanding adhesive tapes were made as follows. To a 60-mL brown amber bottle with TEFLON® sealed cap were added: LUCKAMIDE® (3 grams), particles of polyacrylonitrile pyrolyzed at 300° C. for 8 hours (1.0 g in Sample 20, 1.5 grams in Sample 21, 1 gram in Sample 22, and 0.75 grams in Sample 23), trioxane (0.3 grams) and a 1 to 1 mixture of methanol and 1-propanol (15 grams). The LUCKAMIDE®, DHTBD, and solvent were heated at 160° F. in a water bath to form a solution in which all the ingredients dissolved. Steel shot (60 grams) was then added and the capped container was roll milled or paint shaken for at least 16 hours. Oxalic acid (0.225 grams) was then added. The dispersions were coated using a 30 mil gap square applicator onto a coronatreated release paper (Avery, Paper 116626 4N, Buffalo, N.Y.) and air-dried overnight (16 hours) at room temperature in a fume hood. The coated dry films were about 70 microns thick and were easily peeled from the release paper. The free-standing tapes were stored in a freezer at −21° C. to preserve life. These tapes were compared to another tape (Sample 24) prepared by following the same procedure using ELVAMIDE® (3 grams), PPAN (1 grams), solvent (15 grams), and with no acid and no trioxane.

Example 6
Preparation of Polyamide Adhesive Tapes with Various Amounts of Doted Metal Oxide Polyimide adhesives can be made in accordance with the above Examples 2–5, with the exception that various amounts of a doped metal oxide such as ZELEC® can be added to the adhesive. It is theorized that this will yield a belt material and adhesive that both have similar properties and minimum changes in conductivity as the belt is processed and used in the industry.

Example 7
Preparation of Image-on-Seam Puzzle Cut Seamed Belt

The two puzzle cut ends of the polyimide film prepared in Example 1 were brought together and aligned on the lower jaw of a Technoseal Vertrod Thermal Impulse Heat Sealer (Mod. 20EP/P-1/4-WC-CAN-DIG-1) with the assistance of vacuum holdown tables mounted on both sides of a welder. A freestanding film of the adhesives/release layer (for example, about 8 to about 80 microns thick) formed in accordance with any of the examples above were selected.

A narrow strip (about 1 to about 4 cm) of material was cut to a length and width sufficient to adequately cover the puzzle-cut seam area on the belt substrate. The strip of adhesive/release layer was laid across the top of the seam area covering the seam. The welder was set to a nominal impulse temperature of about 120° C., equivalent to the crosslinking temperature of the LUCKAMIDE®. The seam was welded with applied temperature and pressure for 10 minutes to compression mold the adhesive into the seam kerf, filling it completely. This also initiated crosslinking of the adhesive. Post curing at 120° C. for an additional 30 minutes was required to further crosslink and improve the mechanical properties of the adhesive.

Other methods of hot melt adhesive bonding could be used as well. For example, a heated roll or heated shoe that could move along the seam can be used.

The seamed belt was removed from the fixture, post cured, and the seam was subjected to finishing (sanding) and polishing steps to remove excess adhesive and bring the seam area topography in line with the rest of the belt.

While the invention has been described in detail with reference to specific and in embodiments, it will be appreciated that various modifications and variations will be apparent to the artisan. All such modifications and embodiments as may readily occur to one skilled in the art are intended to be within the scope of the appended claims.

I claim:

1. An endless seamed flexible belt comprising a first end and a second end, each of the first end and the second end comprising a plurality of mutually mating elements which join in an interlocking relationship to form a seam, the belt comprising a substrate and the seam comprising an adhesive comprising a polyamide and a doped metal oxide filler, wherein said polyamide has the following general formula:

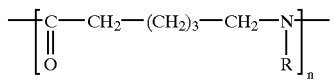

wherein R is selected from the group consisting of hydrogen, alkyl having from about 1 to about 20 carbons, alkoxy having from about 1 to about 20 carbons, alkyl alkoxy having from about 1 to about 20 carbons, and alkylene alkolxy having from about 1 to about 20 carbons, and wherein n is a number of from about 50 to about 1,000.

2. An endless seamed flexible belt in accordance with claim 1, wherein R is a methylene methoxy group.

3. An endless seamed flexible belt in accordance with claim 1, wherein said doped metal oxide filler is selected from the group consisting of antimony doped tin oxide, aluminum doped zinc oxide, antimony doped titanium dioxide, and mixtures thereof.

4. An endless seamed flexible belt in accordance with claim 1, further comprising an additional electrically conductive filler other than a doped metal oxide filler.

5. An endless seamed flexible belt in accordance with claim 4, wherein said additional electrically conductive filler is selected from the group consisting of carbon fillers, metal oxide fillers, polymer fillers, charge transporting molecules, and mixtures thereof.

6. An endless seamed flexible belt in accordance with claim 5, wherein said additional electrically conductive filler is a carbon filler selected from the group consisting of carbon black, graphite, fluorinated carbon, and mixtures thereof.

7. An endless seamed flexible belt in accordance with claim 5, wherein said additional electrically conductive filler is a metal oxide filler selected from the group consisting of titanium dioxide, tin oxide, indium tin oxide, iron oxide, aluminum oxide, and mixtures thereof.

8. An endless seamed flexible belt in accordance with claim 5, wherein said additional electrically conductive filler is a polymer filler selected from the group consisting of polypyrrole, polyacrylonitrile, polythiophene, polyaniline and mixtures thereof.

9. An endless seamed flexible belt in accordance with claim 5, wherein said additional electrically conductive filler is a charge transporting molecule selected from the group consisting of bis(dihydroxy diethylamino) triphenyl methane, bis(diethylamino) triphenyl methane, dihydroxy tetraphenyl biphenylene diamine, and mixtures thereof.

10. An endless seamed flexible belt in accordance with claim 1, wherein said adhesive is crosslinked.

11. An endless seamed flexible belt in accordance with claim 1, wherein said adhesive further comprises carbon black and polyaniline electrically conductive fillers.

12. An endless seamed flexible belt in accordance with claim 11, wherein said substrate comprises antimony doped tin oxide, carbon black, and polyaniline electrically conductive fillers.

13. An endless seamed flexible belt in accordance with claim 1, wherein said substrate comprises a polymer selected from the group consisting of polyimide and polycarbonate.

14. An endless seamed flexible belt in accordance with claim 13, wherein said polyimide is a polyaniline polyimide.

15. An endless seamed flexible belt in accordance with claim 1, wherein said substrate further comprises an electrically conductive filler selected from the group consisting of carbon fillers, metal oxide fillers, doped metal oxide fillers, polymer fillers, charge transporting molecules, and mixtures thereof.

16. An endless seamed flexible belt in accordance with claim 15, wherein said substrate comprises antimony doped tin oxide, carbon black, and polyaniline electrically conductive fillers.

17. An endless seamed flexible belt in accordance with claim 1, wherein said belt is an intermediate transfer belt.

18. An endless seamed flexible belt in accordance with claim 1, wherein said plurality of mutually mating elements are in the form of a puzzle cut pattern.

19. An endless seamed flexible belt in accordance with claim 18, wherein said mutually mating elements comprise a first projection and a second receptacle geometrically oriented so that said second receptacle on the first end receives the first projection on the second end and wherein said first projection on said first end is received by said second receptacle on the second end to form a joint between the first and second ends.

20. An endless seamed flexible belt in accordance with claim 19, wherein said first projection and said second receptacle are curved.

21. An endless seamed flexible belt comprising a first end and a second end, each of the first end and the second end comprising a plurality of mutually mating elements which join in an interlocking relationship to form a seam, said belt comprising a polyimide substrate, and the seam comprising an adhesive comprising an alcohol-soluble polyamide and a doped metal oxide filler, wherein said polyamide has the following general formula:

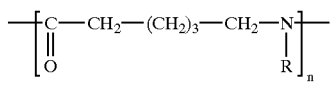

wherein R is selected from the group consisting of hydrogen, alkyl having from about 1 to about 20 carbons, alkoxy having from about 1 to about 20 carbons, alkyl alkoxy having from about 1 to about 20 carbons, and alkylene alkoxy having from about 1 to about 20 carbons, and wherein n is a number of from about 50 to about 1,000.

22. An image forming apparatus for forming images on a recording medium comprising: a charge-retentive surface to receive an electrostatic latent image thereon; a development component to apply toner to the charge-retentive surface to develop the electrostatic latent image to form a developed image on said charge retentive surface; a transfer belt to transfer the developed image from the charge retentive surface to a copy substrate, wherein the transfer belt is an endless seamed flexible belt comprising a first end and a second end, each of the first end and the second end comprising a plurality of mutually mating elements which join in an interlocking relationship to form a seam, the transfer belt comprising a substrate and the seam comprising an adhesive comprising a polyamide and a doped metal oxide filler, wherein said polyamide has the following general formula:

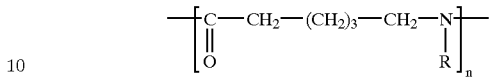

wherein R is selected from the group consisting of hydrogen, alkyl having from about 1 to about 20 carbons, alkoxy having from about 1 to about 20 carbons, alkyl alkoxy having from about 1 to about 20 carbons, and alkylene alkoxy having from about 1 to about 20 carbons, and wherein n is a number of from about 50 to about 1,000, and a fixing component to fuse the developed image to the copy substrate.

* * * * *